(12) United States Patent
Leboeuf

(10) Patent No.: US 10,222,500 B2
(45) Date of Patent: Mar. 5, 2019

(54) METHOD FOR TILT (ROLL) AND PITCH ESTIMATION IN A MULTI-SENSOR STREAMER

(71) Applicant: SERCEL, Carquefou (FR)

(72) Inventor: Simon Leboeuf, Carquefou (FR)

(73) Assignee: SERCEL, Carquefou (FR)

( * ) Notice: Subject to any disclaimer, the term of this patent is extended or adjusted under 35 U.S.C. 154(b) by 149 days.

(21) Appl. No.: 15/081,268

(22) Filed: Mar. 25, 2016

(65) Prior Publication Data

US 2016/0282494 A1   Sep. 29, 2016

(30) Foreign Application Priority Data

Mar. 27, 2015   (EP) ..................... 15305458

(51) Int. Cl.
*G01V 1/38* (2006.01)
(52) U.S. Cl.
CPC .......... *G01V 1/3835* (2013.01); *G01V 1/3817* (2013.01); *G01V 1/3843* (2013.01)
(58) Field of Classification Search
CPC ........... G01V 2210/144; G01V 1/3835; G01V 1/3843; G01V 1/3817
See application file for complete search history.

(56) References Cited

U.S. PATENT DOCUMENTS

| 4,068,208 A | * | 1/1978 | Rice, Jr. ............ | G01V 1/3835 114/244 |
| 4,210,897 A | * | 7/1980 | Hutchins ............ | G01V 1/26 114/244 |

(Continued)

OTHER PUBLICATIONS

Search Report Dated Sep. 18, 2015.
Yamamoto T et al: Experimental Verification and Application of bottom Shear Modules Profiler (BSMP) Method Oct. 1, 1991.
Gratacos B: "Reorientation and Calibration of Non-gimbaled Multicomponents Sensors" Oct. 26, 2003.

(Continued)

*Primary Examiner* — Ian J Lobo
(74) *Attorney, Agent, or Firm* — Ipsilon USA, LLP

(57) ABSTRACT

A method for estimating a tilt angle $\beta(t)$ of at least one given particle motion sensor nearly collocated, in a multi-sensor streamer for seismic prospection, with a pressure sensor. The given particle motion sensor has two orthogonal sensing axes Y and Z in a plane orthogonal to a longitudinal axis of the streamer. The tilt angle is formed by the Z sensing axis and a reference vertical axis Z0. The method comprises, for the given particle motion sensor, a step of computing a first estimate $\beta_0$ of the tilt angle, comprising, while the streamer is being towed: obtaining (41) first data measured by the pressure sensor nearly collocated with the given particle motion sensor; obtaining (42) second and third data measured by the given particle motion sensor along the sensing axes Y and Z respectively; for at least two values of a rotation angle $\theta$, rotating (45) the second and third data by the rotation angle $\theta$, to obtain rotated second and third data; and computing (46-410) a particular value $\theta_{max}$ among the at least two values of the rotation angle, which maximizes, over at least one frequency, a coherence function between the first data and the rotated third data, or between the first data and velocity data resulting from an integration of the rotated third data, the particular value $\theta_{max}$ being equal to said first estimate $\beta_0$. Step of computing a first estimate $\beta0$ of said tilt angle is processed independently of any seismic signal.

12 Claims, 9 Drawing Sheets

(56) References Cited

U.S. PATENT DOCUMENTS

| | | |
|---|---|---|
| 7,889,597 B2 | 2/2011 | Gratacos |
| 2008/0049551 A1 | 2/2008 | Muyzert et al. |
| 2012/0134234 A1 | 5/2012 | Roberts et al. |
| 2015/0016217 A1* | 1/2015 | Hillesund ............ G01V 1/3826 367/15 |

OTHER PUBLICATIONS

Takahashi H et al: "Study on the Deployment of Accelerometers in Reflection Seismic Surveys" Apr. 1, 2007.

* cited by examiner

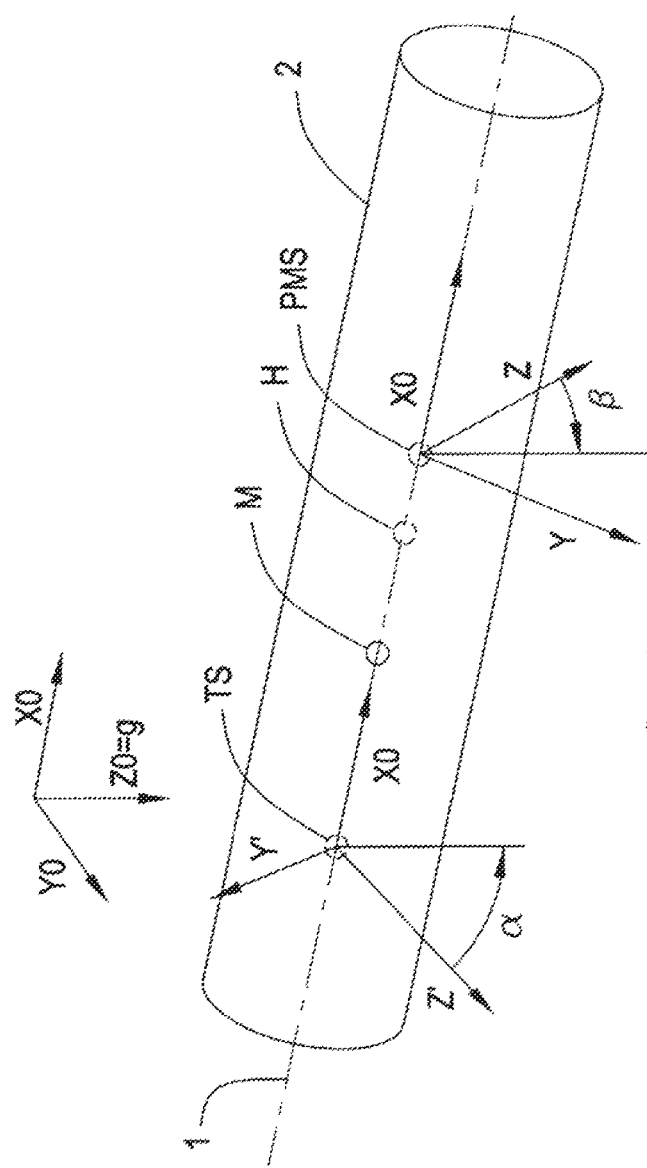
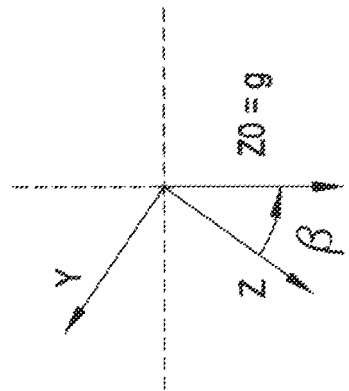
FIG. 1
FIG. 2

METHOD FOR TILT (ROLL) AND PITCH ESTIMATION IN A MULTI-SENSOR STREAMER

This application claims the benefit of priority from European patent application No. 15 305 458.0, filed on Mar. 27, 2015, the entirety of which is incorporated by reference.

1. FIELD OF THE DISCLOSURE

The field of the invention is that of marine seismic prospection, enabling to study the seabed and its sediment layers properties.

More specifically, the invention relates to a method for tilt (also referred to as roll) and pitch (or tilt only) estimation in a multi-sensor streamer (also referred to as "multi-component streamer").

The invention can be applied notably to the oil prospecting industry (hydrocarbon exploration) using seismic method (sea oil survey), but can be of interest for any other field which requires a system performing geophysics data acquisition in a marine environment.

2. TECHNOLOGICAL BACKGROUND

In seismic exploration, geophysical data are obtained by applying acoustic energy to the earth from an acoustic source and detecting seismic energy reflected from interfaces between different layers in subsurface formations. The seismic wave-field is reflected when there is a difference in acoustic impedance between the layers on either side of the interface.

Marine seismic prospection is generally made with seismic streamers (also referred to as "linear acoustic antennas") towed through water, behind a recorder vessel at a water depth normally between about six to about nine meters, but can be towed shallower or deeper. The streamers support pressure sensors such as hydrophones to detect seismic signals corresponding to pressure waves. Seismic sources may be also towed behind the recorder vessel. Seismic sources may be for example air gun arrays or water gun arrays or other sources known to those skilled in the seismic art.

Alternatively, the seismic streamers are maintained at a substantially stationary position in a body of water, either floating at a selected depth or lying on the bottom of the body of water, in which case the source may be towed behind a vessel to generate acoustic energy at varying locations or the source may be maintained in a stationary position.

Multi-component streamers usually use at least two nearly collocated sensors (or group of sensors): one pressure sensor (e.g. hydrophone), or a group of pressure sensors, and at least one particle motion sensor (e.g. geophone or accelerometer), or a group of particle motion sensors. The at least one particle motion sensor (or the group of particle motion sensors) is nearly collocated to the pressure sensor (or the group of pressure sensors).

While the hydrophone is an omnidirectional sensor and so, does not need to be oriented, the particle motion sensors measure the amplitude of the wave (speed or acceleration of the particle) on a given direction. To do so, the orientation of the particle motion sensors must be known.

Knowing that it is nearly impossible to predict the rotation of the streamer in water, there are usually two possible solutions to know said given direction, as discussed below.

A first known solution consists in mechanically insuring that the particle motion sensor is in a known orientation, using for example gravity. One way to perform this is to ballast the particle motion sensor and a gimbal mounts the particle motion sensor in a housing filled with lubricant damping fluid.

This first known solution has the main disadvantage of affecting the particle motion sensor response, as the motion of the sensor induced by streamer rotation is biased by the gimbal arrangement (inertia, friction, etc.). Moreover, such gimbal mounting is usually complex, by involving additional mechanical parts, and takes too much space in the streamer.

A second known solution is to create a 2 or 3-dimension particle motion sensor base and to use a nearly collocated tilt sensor, with a known orientation compared to this base. The tilt measurement is then used to recover the vertical, the cross-line, or the inline component of the particle motion wave. This can for example be implemented through a MEMS ("micro-electro-mechanical system") device, that can measure at the same time the tilt and the acceleration.

An example of this second known solution is now further described with FIGS. 1 and 2.

FIG. 1 presents an example of a portion of a multi-sensor streamer 2 comprising a group of several sensors which are nearly collocated (i.e. in close proximity): a pressure sensor (e.g. hydrophone) H, a particle motion sensor (e.g. geophone or accelerometer) PMS and a tilt sensor (e.g. a MEMS device) TS.

(X0,Y0,Z0) is the reference right-handed coordinate system. X0 (reference horizontal axis) is considered as collinear with the longitudinal axis 1 of the streamer 2 and points towards the tail end of the streamer. Z0 (reference vertical axis) is collinear with the gravity vector g (true vertical position) and points towards the earth (Z0=g).

The particle motion sensor PMS is for example a 2-axis accelerometer that measures seismic signal.

If the sensor cannot measure the static acceleration (i.e. gravity) (e.g. a piezo capacitive sensor), therefore it cannot measure directly the angular position. The particle motion sensor of FIG. 1 has two orthogonal sensing axes Y and Z, in a plane orthogonal to the longitudinal axis 1 of the streamer 2. The tilt angle $\beta$ of the particle motion sensor PMS (also referred to as the angular position of the particle motion sensor) is formed by the Z sensing axis and the gravity vector (Z0=g) (see FIG. 2).

As the tilt angle $\beta$ of the particle motion sensor PMS cannot be measured directly, the role of the tilt sensor TS is to measure the tilt angle $\alpha$ of the tilt sensor (also referred to as the angular position of the tilt sensor). The tilt sensor of FIG. 1 has two orthogonal sensing axes Y' and Z', in a plane orthogonal to the longitudinal axis 1 of the streamer 2. The tilt angle $\alpha$ of the tilt sensor is formed by the Z' sensing axis and the gravity vector (Z0=g) (see FIG. 1).

The tilt angle of the particle motion sensor versus time can be written as:

$\beta(t)=\beta'(t)+\alpha(t)$, with $\beta'(t)$ the angular offset between the particle motion sensor PMS and the tilt sensor TS.

The locations of the tilt sensor TS and the particle motion sensor PMS are very close, that's why we can consider that they have an identical rotational motion. Therefore $\beta'$ can be considered as constant: $\beta(t)=\beta'+\alpha(t)$. In general, $\beta'$ is calibrated during the manufacturing and the system is able to calculate $\beta(t)$ when $\alpha(t)$ is measured.

Therefore the system of FIGS. 1 and 2 operates as follows: it first records the acceleration with the sensing axes Y and Z (the corresponding acceleration data are noted respectively AccY(t) and AccZ(t)) and measures α(t). Knowing β', the system is able to calculate β(t).

The final acceleration data (noted AccY$_0$(t) and AccZ$_0$(t)) have to be expressed in the coordinate system (X0,Y0,Z0). To this end, the system performs a rotation (around X0) of β(t) of the acceleration data AccY(t) and AccZ(t), according to the following formula:

$$\begin{pmatrix} AccY_0(t) \\ AccZ_0(t) \end{pmatrix} = \begin{pmatrix} \cos\beta(t) & \sin\beta(t) \\ -\sin\beta(t) & \cos\beta(t) \end{pmatrix} \times \begin{pmatrix} AccY(t) \\ AccZ(t) \end{pmatrix}$$

The system records simultaneously the pressure P(t) through the pressure sensor (e.g. hydrophone) H at the same location. The pressure sensor H is nearly collocated (i.e. is in close proximity) with the particle motion sensor PMS.

The second known solution solves the main disadvantage of the first known solution (see above), but it has the drawback of requiring a tilt sensor TS (which is an additional sensor), at the particle motion sensor's location, and its associated power.

The angular offset β' between the particle motion sensor PMS and the tilt sensor TS needs to be known precisely. For now, this requires a calibration procedure during manufacturing. This kind of procedure is often costly.

The angular offset β' has to be constant. For now, there is no easy mean to check the value (accuracy) of this angular offset β' while the streamers are at sea.

Moreover there is no mean to check the quality of the tilt angle α of the tilt sensor while the streamers are at sea.

Requiring an additional sensor also means more wires in the streamer and so, some impact on the overall weight and size of the streamer.

Document GRATACOS B: "Reorientation and calibration of nongimbaled multicomponents sensors", ANNUAL INTERNATIONAL SEG MEETING, EXPANDED ABSTRACTS, TULSA, Okla., US, 26 Oct. 2803 (2883-18-26), pages 838-841, referred hereinafter as GRATACOS, deals with reorientations and calibration method for non gimballed multicomponents sensors. However said sensor are supported by a cable that is laid out on the sea floor. Such a cable is usually referred as an Ocean Bottom Cable, and is not intended to be towed nor to move once laid on the sea bed, conversely to a streamer.

The method for determining orientation of the sensors according to GRATACOS uses a seismic signal resulting from a shot of a seismic source. However a seismic signal resulting from a shot of a seismic source is a punctual event corresponding in the example of GRATACOS to a time-window of 500-700 msec. Such time-window is not adapted to determine continuously the tilt angle of a sensor supported by a streamer. Furthermore, using a seismic signal to determine the orientation of a sensor according to GRATACOS method implies to solve ghost issues that lead to a complex method.

There is thus a need in the art for reliably and simply determining orientation of a sensor supported by a towed streamer.

3. GOALS OF THE INVENTION

The invention, in at least one embodiment, is aimed especially at overcoming at least part of the different drawbacks of the prior art.

More specifically, it is a goal of at least one embodiment of the invention to provide a technique that gives an estimate β$_{est}$ of the tilt angle β(t) of a defined particle motion sensor comprised in a towed multi-sensor streamer, without the need of a nearly collocated tilt sensor (i.e. without measuring α(t)).

It is another goal of at least one embodiment of the invention to provide a technique of this kind that can be used, possibly at sea, to calibrate the angular offset β' between the particle motion sensor and the tilt sensor.

It is another goal of at least one embodiment of the invention to provide a technique of this kind that can be used, possibly at sea, to check the value (accuracy) of the angular offset β'.

It is another goal of at least one embodiment of the invention to provide a technique of this kind that can be used, possibly at sea, to check the quality of the tilt angle α of the tilt sensor while the streamers are at sea.

It is another goal of at least one embodiment of the invention to provide a technique of this kind that can be used to perform the rotation of the acceleration data AccY(t) and AccZ(t), in order to obtain the final acceleration data AccY$_0$(t) and AccZ$_0$(t).

It is another goal of at least one embodiment of the invention to provide a technique of this kind that gives also an estimate of a pitch angle Ψ(t) (see definition below) of the particle motion sensor.

4. SUMMARY

A particular aspect of the present disclosure relates to a method for estimating a tilt angle β(t) of at least one given particle motion sensor nearly collocated, in a towed multi-sensor streamer for seismic prospection, with a pressure sensor, said given particle motion sensor having two orthogonal sensing axes Y and Z in a plane orthogonal to a longitudinal axis of the streamer, the tilt angle being formed by said Z sensing axis a reference vertical axis Z0. This method comprises, for said given particle motion sensor, a step of computing a first estimate β$_0$ of said tilt angle, comprising, while the streamer is being towed:

obtaining first data (P(t)) measured by the pressure sensor nearly collocated with said given particle motion sensor;

obtaining second and third data (AccY(t), AccZ(t)) measured by said given particle motion sensor along the sensing axes Y and Z respectively;

for at least two values of a rotation angle θ, rotating the second and third data by the rotation angle θ, to obtain rotated second and third data (AccY$_\theta$(t), AccZ$_\theta$(t)); and computing a particular value θ$_{max}$ among said at least two values of the rotation angle, which maximizes, over at least one frequency, a coherence function between the first data and the rotated third data, or between the first data and velocity data resulting from an integration of the rotated third data, said particular value θ$_{max}$ being equal to said first estimate β$_0$, wherein said step of computing a first estimate β$_0$ of said tilt angle is processed independently of any seismic signal In other words, the tilt angle is estimated without having to use any seismic signal resulting out of a shot of a seismic source.

However, the occurrence of a shot does not prevent estimating the tilt angle. According to embodiments, the related seismic data recorded by the sensors may be filtered.

Conversely the method with which GRATACOS deals, implies using seismic data resulting out of a shot of a seismic source, what enables only a punctual determination of the orientation of the sensor(s) due to the very short time-window of a seismic signal.

Furthermore measuring data of the pressure sensor and of said given particle motion sensor wherein said sensors are supported by a towed streamer, enables measuring signal of sufficient amplitudes to get reliable results. Indeed, in the case of a towed streamer, signals measured by said sensors are related to the changes in the height of the water column that are created by ocean waves and the vertical motion of the streamer. Changes in the height of the water column above the sensors can be reliably detected by the sensors provided on the towed streamer thanks to the vertical motion of the towed streamer that gives amplitude to said changes, contrarily to GRATACOS method for which the cable, that corresponds to an Ocean Bottom Cable, and thus its related sensors, are laid on the sea bed what does not permit to reliably detect changes in the height of the water column. Indeed amplitude of the changes of the water column above the sensors in the case of an Ocean Bottom Cable would be very low and undetectable, due to the stationary position of the cable and to the depth at which it is located.

Being not compelled to use a seismic signal to determine orientation of said given particle motion sensor, enables to continuously determine said orientation.

Embodiments rely on a wholly novel and inventive approach taking advantage of the fact that the analysis of multi-sensor streamer seismic records (including tilt sensor data) shows that the rotational motion of the streamer consists in low frequency oscillations (typically below 2 Hz) around a quasi-static position.

Therefore the tilt angle $\beta(t)$ of the particle motion sensor (formed by the Z sensing axis of the particle motion sensor and the gravity vector ($Z0=g$)) can be written as: $\beta(t) \approx \beta_0 + \beta a(t)$, with $\beta_0$ a static position and $\beta a(t)$ a small angle variation (below 2 Hz, amplitude of a few degrees only).

Being able to compute $\beta_0$ enables to have a first estimate of the tilt angle $\beta(t)$. Indeed, $\beta_0$ is a rough estimate of the tilt angle $\beta(t)$, but in some implementations (see examples below) it is accurate enough to be used alone, i.e. without the other parameter $\beta a(t)$.

As discussed below, being able to compute $\beta a(t)$ enables to have a second estimate of the tilt angle $\beta(t)$: $\beta_{est}(t)=\beta_0+\beta a(t)$. The second estimation is a refined estimate compared with the first estimate $\beta_0$.

Regarding more precisely how the first estimate $\beta_0$ is computed, the general principle is based on the fact that the analysis of the streamer (cable) motion shows that:
  transverse acceleration waves (whose oscillations occur perpendicular to the direction of propagation) lead to streamer motion (up, down and sideways); and
  in the very low frequencies (0.5 Hz to 3 Hz), the vertical streamer motion results in hydrostatic pressure variations.

More precisely, in the very low frequencies (0.5 Hz to 3 Hz), the hydrophone signal energy is mainly related to hydrostatic pressure variations. These variations are due to changes in the height of the water column that are created by ocean waves and the vertical motion of the streamer. Above 3 Hz and up to 10/15 Hz, hydrophone signal energy is mostly related to flow noise caused by ocean swell and tugging noise caused by the vessel. As a result, the spectral coherence between the vertical streamer motion data and the hydrophone data in the frequency range [0.5-3 Hz] is very strong. On the contrary, the coherence between the vertical and horizontal motions of the streamer is very low for these very low frequencies. Above 3 Hz, there is no coherence anymore due to the type of the noise.

Therefore we can find a good first estimate $\beta_0$ of the tilt angle $\beta(t)$ of the particle motion sensor by finding the angle ($\theta_{max}$) that maximizes the spectral coherence between the data measured by the pressure sensor (e.g. hydrophone data) and the data measured by the particle motion sensor along its Z sensing axis (e.g. data noted AccZ(t) in the above particular case where the particle motion sensor is an accelerometer). For example, with a length of dataset equal to 60 s, the accuracy of the first estimate $\beta_0$ of the tilt angle can be as good as +/−2°.

Thus, the first estimate $\beta_0$ of the tilt angle $\beta(t)$ of the particle motion sensor is computed without the need of a nearly collocated tilt sensor, i.e. without measuring $\alpha(t)$.

According to a particular feature, said step of computing the first estimate $\beta_0$ of said tilt angle further comprises:
  rotating the third data by the particular value $\theta_{max}$ of the rotation angle $\theta$, to obtain $\theta_{max}$-rotated third data (AccZ$_{\theta max}$(t));
  computing a cross-correlation between the $\theta_{max}$-rotated third data (AccZ$_{\theta max}$(t)) and the first data (P(t)); and
  depending on the computed cross-correlation, correcting or not by $\pi$ radians the particular value $\theta_{max}$.

This allows to remove an ambiguity concerning the coherence results (which give a maximum for both AccZ$_{\theta max}$ pointing downward (like Z0) and AccZ$_{\theta max}$ pointing upward).

According to a particular feature, said step of computing the first estimate $\beta_0$ of the tilt angle is carried out for each of a plurality of particle motion sensors, and the method comprises a step of computing a second estimate $\beta_{est}(t)=\beta_0+\beta a(t)$, of the tilt angle for each of the plurality of particle motion sensors, comprising:
  for each of the particle motion sensors, rotating the second data and third data by a rotation angle equal to the first estimate $\beta_0$, to obtain $\beta_0$-rotated second data (AccYa(t)) and $\beta_0$-rotated third data (AccZa(t));
  applying a filter on the $\beta_0$-rotated second and third data previously obtained for the plurality of particle motion sensors, to eliminate transverse acceleration motion and obtain filtered second data (AccYafk(t)) and filtered third data (AccZafk(t)) for each of the particle motion sensors;
  for each of the particle motion sensors, computing the angle $\beta a(t)$, knowing impulse response characteristics of said particle motion sensor and using a deconvolution method;
  for each of the particle motion sensors, obtaining the second estimate $\beta_{est}(t)$ of the tilt angle, by summing the first estimate $\beta_0$ and the angle $\beta a(t)$.

As specified above, the tilt angle $\beta(t)$ of the particle motion sensor can be written as: $\beta(t) \approx \beta_0+\beta a(t)$, with $\beta_0$ a static position and $\beta a(t)$ a small angle variation.

The second estimation ($\beta_{est}(t)=\beta_0+\beta a(t)$) is a refined estimate compared with the first estimate $\beta_0$, since it takes into account also the parameter $\beta a(t)$.

According to a particular feature, the method comprises, for said at least one given particle motion sensor, the following step:
  rotating the second and third data (AccY(t), AccZ(t)) by a rotation angle equal to the first estimate $\beta_0$ or the second estimate $\beta_{est}(t)$, to obtain final data (AccY$_0$(t), AccZ$_0$(t)) expressed in a coordinate system (X0,Y0,Z0), with Z0 said reference vertical axis and X0 a reference horizontal axis considered as collinear with the longitudinal axis of the streamer.

According to a particular feature, the coherence function is maximized over a predetermined range of frequencies that correspond to frequencies of signals related to the changes in the height of the water column above the pressure sensor and said given particle motion sensor. As reminded above changes in the height of the water column are created by ocean waves and the vertical motion of the streamer. Said range of frequencies differs from the frequency band of interest of a seismic signal.

Thus, data are measured in said range of frequencies related to the changes in the height of the water column above the pressure sensor and said given particle and the coherence function is maximized over said predetermined range of frequencies.

According to a particular feature, the coherence function is maximized over a predetermined range of frequencies that is 0.5 Hz to 3 Hz. Data are also measured in said range of frequencies of 0.5 Hz to 3 Hz.

According to a particular feature, said given particle motion sensor is a piezoelectric sensor.

Another particular aspect of the present disclosure relates to a method for estimating a tilt angle $\beta(t)$, also referred to as roll angle, and a pitch angle $\Psi(t)$ of at least one given particle motion sensor (PMS) nearly collocated, in a multi-sensor streamer for seismic prospection, with a pressure sensor (H), said given particle motion sensor having three orthogonal sensing axes X, Y and Z, with Y and Z in a plane orthogonal to a longitudinal axis of the streamer and X collinear with the longitudinal axis of the streamer, the tilt angle being formed by said Z sensing axis and a reference vertical axis Z0, the pitch angle being formed by said X sensing axis and a reference horizontal axis X0, wherein said method comprises, for said given particle motion sensor, a step of computing a first estimate $\beta_0$ of said tilt angle and an estimate $\Psi_0$ of said pitch angle, comprising, while the streamer is being towed:

obtaining first data (P(t)) measured by the pressure sensor nearly collocated with said given particle motion sensor;

obtaining second, third and fourth data (AccY(t), AccZ(t), AccX(t)) measured by said given particle motion sensor along the sensing axes Y, Z and X respectively;

for at least two pairs of values, each pair comprising a value of a rotation angle $\theta$ around said X sensing axis and a value of a rotation angle $\varphi$ around said Y sensing axis, rotating the second, third and fourth data by the rotation angles $\theta$ and $\varphi$, to obtain rotated second, third and fourth data (AccY$_{\theta\varphi}$(t), AccZ$_{\theta\varphi}$(t), AccX$_{\theta\varphi}$((t); and computing a particular pair of values $\theta_{max}$ and $\varphi_{max}$ among said at least two pairs of values, which maximizes, over at least one frequency, a coherence function between the first data and the rotated third data, or between the first data and velocity data resulting from an integration of the rotated third data, $\theta_{max}$ being equal to said first estimate $\beta_0$ of the tilt angle and $\varphi_{max}$ being equal to said estimate $\Psi_0$ of the pitch angle, wherein said step of computing a first estimate $\beta0$ of said tilt angle and an estimate $\Psi0$ of said pitch angle, is processed independently of any seismic signal.

According to a particular feature, the coherence function is maximized over a predetermined range of frequencies, said frequencies corresponding to frequencies related to the changes in the height of the water column above the pressure sensor (H) and said given particle motion sensor. As reminded above changes in the height of the water column are created by ocean waves and the vertical motion of the streamer. Said range of frequencies differs from the frequency band of interest of a seismic signal.

Thus, data are measured in said range of frequencies related to the changes in the height of the water column above the pressure sensor and said given particle and the coherence function is maximized over said predetermined range of frequencies.

According to a particular feature, the coherence function is maximized over a predetermined range of frequencies that is 0.5 Hz to 3 Hz.

According to a particular feature, said given particle motion sensor is a piezoelectric sensor.

According to a particular feature, said step of computing the first estimate $\beta_0$ of said tilt angle further comprises:

rotating the third data by the particular pair of values $\theta_{ax}$ and $\varphi_{max}$, to obtain $\theta_{max}$ and $\varphi_{max}$-rotated third data (AccZ$_{\theta max, \varphi max}$(t));

computing a cross-correlation between the $\theta_{max}$ and $\varphi_{max}$-rotated third data (AccZ$_{\theta max, \varphi max}$(t)) and the first data (P(t)); and depending on the computed cross-correlation, correcting or not by $\pi$ radians the particular value $\theta_{max}$.

According to a particular feature, said step of computing the first estimate $\beta_0$ of the tilt angle and the estimate $\Psi_0$ of the pitch angle is carried out for each of a plurality of particle motion sensors, and in that it comprises a step of computing a second estimate $\beta_{est}(t)=\beta_0+\beta a(t)$, of the tilt angle for each of the plurality of particle motion sensors, comprising:

for each of the particle motion sensors, rotating the second, third and fourth data by rotation angles equal to the first estimate $\beta_0$, to obtain $\beta_0$-rotated second, third and fourth data (AccYa(t), AccZa(t), AccXa(t));

applying a filter on the $\beta_0$-rotated second, third and fourth data previously obtained for the plurality of particle motion sensors, to eliminate transverse acceleration motion and obtain filtered second, third and fourth data (AccYafk(t), AccZafk(t), AccXafk(t)) for each of the particle motion sensors;

for each of the particle motion sensors, computing the angle $\beta a(t)$, knowing impulse response characteristics of said particle motion sensor and using a deconvolution method;

for each of the particle motion sensors, obtaining the second estimate $\beta_{est}(t)$ of the tilt angle, by summing the first estimate $\beta_0$ and the angle $\beta a(t)$.

According to a particular feature, the method comprises, for said at least one given particle motion sensor, the following step:

rotating the second, third and fourth data (AccY(t), AccZ(t), AccX(t)) by a rotation angle equal to the first estimate $\beta_0$ or the second estimate $\beta_{est}(t)$ and by a rotation angle equal to the estimate $\Psi_0$, to obtain final data (AccY$_0$(t), AccZ$_0$(t), AccX$_0$(t)) expressed in a coordinate system (X0,Y0,Z0), with Z0 said reference vertical axis and X0 said reference horizontal axis.

According to a particular feature, said given particle motion sensor is a geophone or an accelerometer, and the pressure sensor is a hydrophone.

According to a particular feature, the at least two values of the rotation angle $\theta$ are values comprised between 0 and $\pi$ radians.

For example, 180 values of the rotation angle $\theta$ are used, one per degree. The accuracy of the first estimate $\beta_0$ depends on the number of values of the rotation angle $\theta$ that are used.

According to a particular feature, the values of the rotation angle $\varphi$ are values comprised between $-\pi/2$ radians and $\pi/2$ radians.

According to a particular feature, the particular value $\theta_{max}$ maximizes, over a predetermined range of frequencies, the coherence function between the first data and the rotated third data, or between the first data and the velocity data resulting from the integration of the rotated third data.

The accuracy of the first estimates $\beta_0$ and $\Psi_0$ depends on the number of frequencies over which the coherence function is maximized.

According to a particular feature, said filter is a FK filter applied in the frequency-wavenumber domain.

In a first particular implementation, the method comprises, for said at least one given particle motion sensor, the following steps:

obtaining tilt data outputted by a tilt sensor nearly collocated, in the multi-sensor streamer, with said given particle motion sensor and relating to a tilt angle $\alpha(t)$ of said tilt sensor;

checking an accuracy of a known angular offset $\beta'$, between the tilt angle $\beta(t)$ of said given particle motion sensor and the tilt angle $\alpha(t)$ of said tilt sensor, by comparing said angular offset $\beta'$ with a difference between the first estimate $\beta_0$ or the second estimate $\beta_{est}(t)$ and the tilt data outputted by the tilt sensor.

Thus, in this first implementation, the proposed technique allows, possibly at sea, to check the value (accuracy) of the angular offset $\beta'$.

In a second particular implementation, the method comprises, for said at least one given particle motion sensor, the following steps:

obtaining tilt data outputted by a tilt sensor nearly collocated, in the multi-sensor streamer, with said given particle motion sensor and relating to a tilt angle $\alpha(t)$ of said tilt sensor;

computing an estimate $\beta'_{est}$ of an unknown angular offset $\beta'$, between the tilt angle $\beta(t)$ of said given particle motion sensor and the tilt angle $\alpha(t)$ of said tilt sensor, by computing a difference between the first estimate $\beta_0$ or the second estimate $\beta_{est}(t)$ and the tilt data outputted by the tilt sensor.

Thus, in this second implementation, the proposed technique allows, possibly at sea, to calibrate (compute) the angular offset $\beta'$ between the particle motion sensor and the tilt sensor.

In a third particular implementation, the method comprises, for said at least one given particle motion sensor, the following steps:

obtaining tilt data outputted by a tilt sensor nearly collocated, in the multi-sensor streamer, with said given particle motion sensor and relating to a tilt angle $\alpha(t)$ of said tilt sensor;

obtaining a known angular offset $\beta'$, between the tilt angle $\beta(t)$ of said given particle motion sensor and the tilt angle $\alpha(t)$ of said tilt sensor;

checking an accuracy of said tilt data, by comparing said tilt data with a difference between the first estimate $\beta_0$ or the second estimate $\beta_{est}(t)$ and the known angular offset $\beta'$.

Thus, in this third implementation, the proposed technique allows, possibly at sea, to check the quality of the tilt angle $\alpha$ of the tilt sensor.

In a fourth particular implementation, the method comprises, for said at least one given particle motion sensor, the following steps:

obtaining magnetic component data outputted by a magnetometer nearly collocated, in the multisensor streamer, with said given particle motion sensor;

combining said magnetic component data and the first estimate $\beta_0$ or the second estimate $\beta_{est}(t)$ of the tilt angle $\beta(t)$ of said given particle motion sensor, to obtain compass heading data.

Thus, in this fourth implementation, the proposed technique allows to obtain easily compass heading data, without the need of using a compass device (e.g. clamped externally on the streamer).

Another aspect of the present disclosure relates to a computer program product comprising program code instructions for implementing the above-mentioned method (in any of its different embodiments) when said program is executed on a computer or a processor.

Another aspect of the present disclosure relates to a non-transitory computer-readable carrier medium, storing a program which, when executed by a computer or a processor causes the computer or the processor to carry out the above-mentioned method (in any of its different embodiments).

5. LIST OF FIGURES

Other features and advantages of embodiments shall appear from the following description, given by way of indicative and non-exhaustive examples and from the appended drawings, of which:

FIG. 1, already described with reference to the prior art, presents an example of a portion of a multi-sensor streamer comprising a group of several sensors (pressure sensor, particle motion sensor and tilt sensor) and their orientation;

FIG. 2, already described with reference to the prior art, illustrates the sensing axes Y and Z of the particle motion sensor, the tilt angle $\beta$ and the gravity vector $Z0=g$;

6. DETAILED DESCRIPTION

In all of the figures of the present document, identical elements and steps are designated by the same numerical reference sign.

6.1 First Particular Embodiment (Estimation of the Tilt Angle)

6.1.1 General Principle

As specified above, the analysis of multi-sensor streamer seismic records (including tilt sensor data) shows that the rotational motion of the streamer consists in low frequency oscillations around a quasi-static position. Therefore the tilt angle $\beta(t)$ of the particle motion sensor (as defined above) can be written as: $\beta(t) \approx \beta_0 + \beta a(t)$, with $\beta_0$ a static position and $\beta a(t)$ a small angle variation.

In the first particular embodiment presented below, we detail first how to compute $\beta_0$ and then how to compute $\beta a(t)$, in a particular embodiment of the proposed method. $\beta_0$ can be seen as a first (rough) estimate of the tilt angle β(t). $β_{est}(t) \approx β_0 + βa(t)$) can be seen as a second (refined) estimate of the tilt angle β(t).

In the below description of the first particular embodiment, we refer to the example context of FIGS. 1 and 2, and we consider that each group of sensors (which are nearly collocated) comprises: a pressure sensor (e.g. hydrophone) H, a particle motion sensor (e.g. accelerometer) PMS and a tilt sensor (e.g. MEMS device) TS. We consider for example a length of dataset equal to 60 s.

6.1.2 Device Carrying Out the Method

Figure 3:
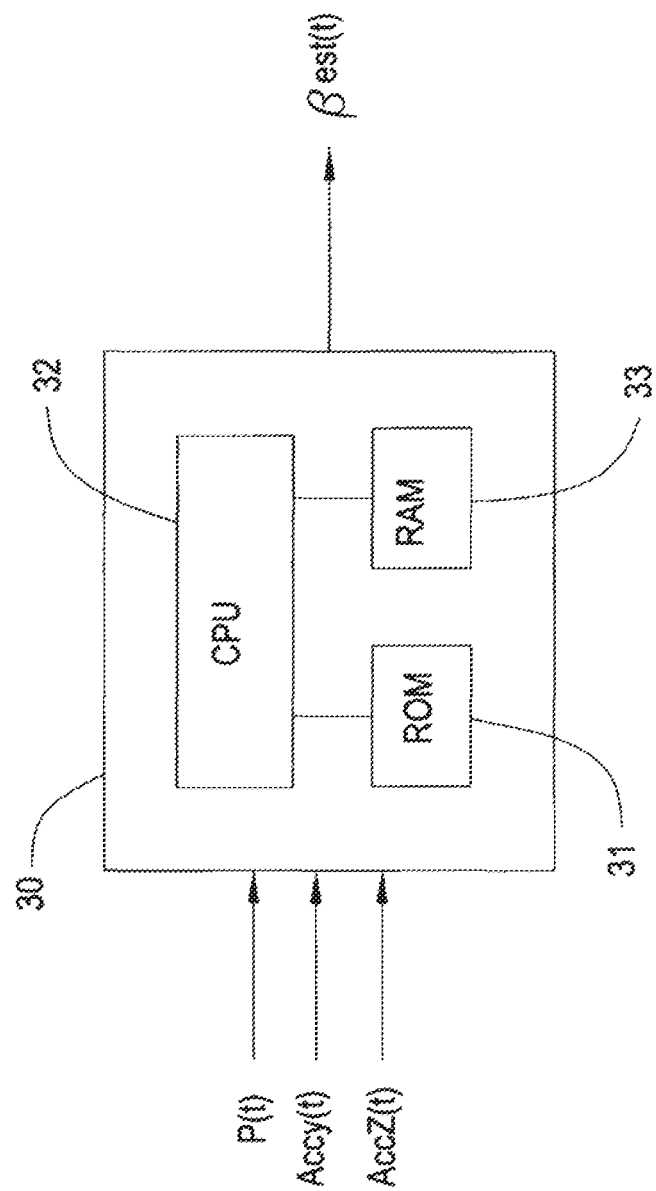
FIG. 3 shows the simplified structure of a device according to a particular embodiment of the invention.

We consider the proposed method is carried out by a device. FIG. 3 shows the simplified structure of this device, according to a particular embodiment. The device 30 comprises a non-volatile memory 31 (e.g. a read-only memory (ROM) or a hard disk), a volatile memory 33 (e.g. a random access memory or RAM) and a processor 32. The non-volatile memory 31 is a non-transitory computer-readable carrier medium. It stores executable program code instructions, which are executed by the processor 32 in order to enable implementation of the proposed method described below (see FIGS. 4 and 5). Upon initialization, the aforementioned program code instructions are transferred from the non-volatile memory 33 to the volatile memory 311 so as to be executed by the processor 32. The volatile memory 31 likewise includes registers for storing the variables and parameters required for this execution.

All the steps of the proposed method can be implemented equally well:

by the execution of a set of program code instructions executed by a reprogrammable computing machine such as a PC type apparatus, a DSP (digital signal processor) or a microcontroller. This program code instructions can be stored in a non-transitory computer-readable carrier medium that is detachable (for example a floppy disk, a CD-ROM or a DVD-ROM) or non-detachable; or by a dedicated machine or component, such as an FPGA (Field Programmable Gate Array), an ASIC (Application-Specific Integrated Circuit) or any dedicated hardware component.

In other words, the invention is not limited to a purely software-based implementation, in the form of computer program instructions, but that it can also be implemented in hardware form, or any form combining a hardware portion and a software portion. For example, each step of FIGS. 4 and 5 (or FIG. 12 for the second particular embodiment) may be carried out by a unit, which itself may be implemented in hardware only or a combination of hardware and software.

6.1.3 $β_0$ Estimation Procedure

Figure 4:
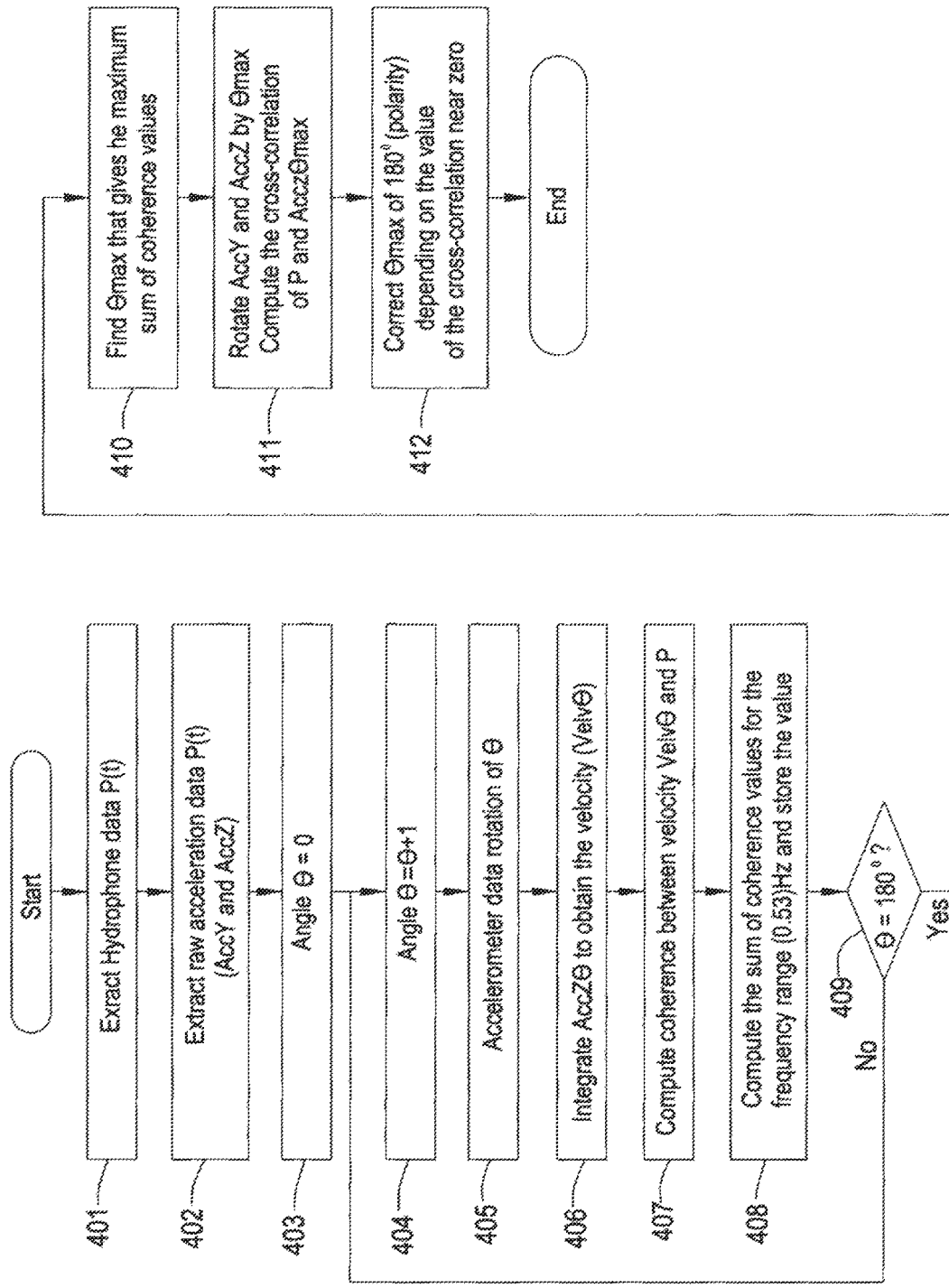
FIG. 4 is a flowchart of a $\beta_0$ estimation procedure, which is a first part of a first particular embodiment of the proposed method.

The flowchart of this procedure is shown in FIG. 4, for the particle motion sensor (accelerometer in the below example) PMS of a given group of nearly collocated sensors (as defined above).

In step 401, the device 30 obtains (extracts) hydrophone data P(t) measured by the hydrophone H.

In step 402, the device obtains (extracts) acceleration data, AccY(t) and AccZ(t), measured by the accelerometer PMS along the sensing axes Y and Z respectively.

In step 403, an angle α (which is a variable) is initialized to zero.

For different values of θ between 0 and π radians (in this example, 180 values, one per degree from 1° to 180°; see steps 404 and 409), the device carries out steps 405 to 408.

In step 405, the device rotates the acceleration data AccY(t) and AccZ(t), by the current value of the angle θ, to obtain rotated acceleration data $AccY_θ(t)$ and $AccZ_θ(t)$:

$$\begin{pmatrix} AccY_θ(t) \\ AccZ_θ(t) \end{pmatrix} = \begin{pmatrix} \cosθ & \sinθ \\ -\sinθ & \cosθ \end{pmatrix} \times \begin{pmatrix} AccY(t) \\ AccZ(t) \end{pmatrix}$$

In step 406, the devices integrates the rotated acceleration data $AccZ_θ(t)$ to obtain velocity data Velvθ.

In step 407, the device computes a coherence value between the hydrophone data P(t) and the velocity data Velvθ.

The coherence between two signals x and y is for example given by the following formula:

$$Cxy(f) = \frac{|Sxy(f)|^2}{Sxx(f)Syy(f)}$$

with Sxy the cross spectral density of x and y, Sxx and Syy respectively the spectral density of x and y. Cxy gives for each frequency f a value in the range [0 1]. A common physical phenomenon with a frequency f1 and sensed by both x and y will result in a strong coherence value (~1) at the frequency f1.

In step 408, the device computes the sum of coherence values for a determined number of frequencies comprised in a determined frequency range, and stores the sum value. In a particular embodiment, the frequency range is [0.5 Hz 3 Hz] and a step of 0.1 Hz between 0.5 and 3 Hz can be used (i.e. the following frequencies are used: 0.1 Hz, 0.2 Hz, 0.3 Hz . . . till 3 Hz).

In step 410, the device finds $θ_{max}$, the value of 0 associated with the maximum sum value. In other words, $θ_{max}$ maximizes the coherence between the hydrophone data P(t) and the velocity data Velvθ. The principle is that the vertical motion due to hydrostatic pressure variations is supposed to be along Z0.

In an alternative embodiment, step 406 is omitted and in step 407 the device computes a coherence value between the hydrophone data P(t) and the rotated acceleration data $AccZ_θ(t)$. In this case, $θ_{max}$ found in step 410 maximizes the coherence between the hydrophone data P(t) and the rotated acceleration data $AccZ_θ(t)$.

Steps 411 and 412 are carried out to remove an ambiguity concerning the coherence results, which give a maximum for both $AccZ_{θmax}$ pointing downward (like Z0) and $AccZ_{θmax}$ pointing upward.

In step 411, the device rotates the acceleration data AccY(t) and AccZ(t), by $θ_{max}$, to obtain θ-rotated acceleration data $AccY_{θmax}(t)$ and $AccZ_{θmax}(t)$. Then the device computes a cross-correlation between the $AccZ_{θmax}(t)$) and the hydrophone data P(t).

In step 412, depending on the value of the cross-correlation function around 0, the value of $θ_{max}$ obtained in the previous step 410 is corrected or not by π radians (180°). The value of $θ_{max}$ needs (respectively doesn't need) to be corrected if the cross-correlation function gives a negative (respectively positive) value around the zero region of the time axis.

The value resulting from step 412 (i.e. the value of $θ_{max}$ corrected if necessary) is equal to $β_0$.

6.1.4 βa(t) Estimation Procedure

The estimation of the angle βa(t) is based on the following principle. Let's say that the streamer is rotating and that the gravity g is the only acceleration seen by the streamer (radial, centripetal and transverse accelerations are ignored). Knowing that the analog sensors (particle motion sensor PMS) used in seismic streamer behave as high-pass filters and cannot record constant signal, the accelerations really recorded by the sensor will be:

$$\begin{pmatrix} AccY(t) \\ AccZ(t) \end{pmatrix} = g \cdot \begin{pmatrix} -h(t) * \sin\beta(t) \\ h(t) * \cos\beta(t) \end{pmatrix}$$

where h is the impulse response of the input filter (usually 1st or 2nd order high pass filter) of the analog sensor and * is the convolution product operator.

Figure 6:
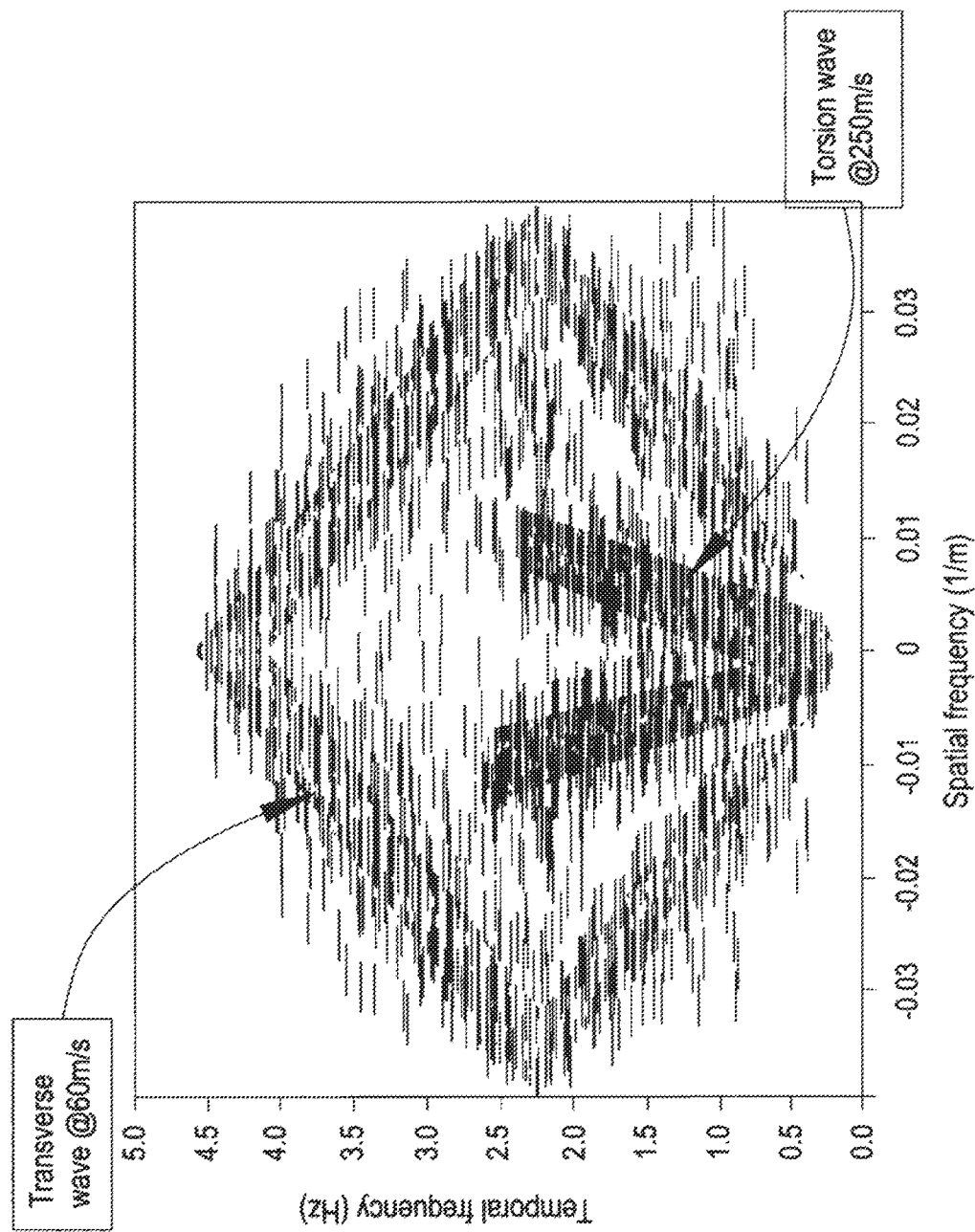
FIG. 6 is a FK diagram of a cross-line dataset showing transverse and torsion waves.
Figure 7:
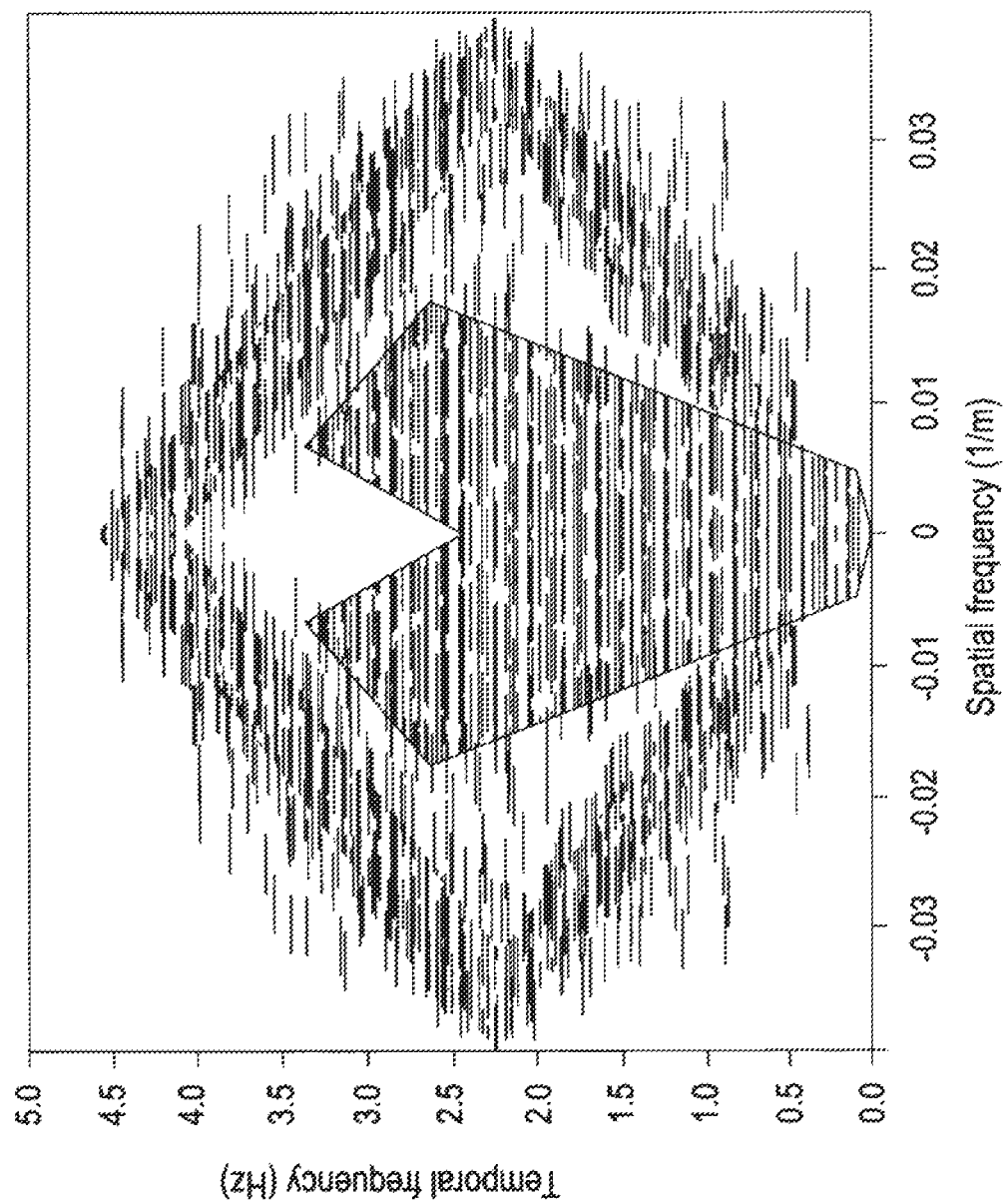
FIG. 7 shows the FK diagram of FIG. 6 with an example of FK filter mask.

The statement above is true for an ideal streamer but not for a real streamer that sees not only the gravity but also strong transverse accelerations. The goal is then to keep only the part of the signal that is related to the rotational motion. We know that torsion waves and transverse waves (i.e. cross-line waves) have different wave speeds (typically 250 m/s for torsion waves and 40 to 60 m/s for transverse waves). We know also that torsion wave bandwidth is very small (typically below 2 Hz). Therefore an adequate filter in the FK (frequency-wavenumber) domain can be used to eliminate the transverse acceleration motion from the acceleration data and obtain a signal nearby the ideal case described above where only the gravitational noise remains. The FIG. 6 shows an example of cross-line acceleration data in FK domain. The FIG. 7 shows an example of corresponding FK filter mask.

However, it is not possible to apply the filter on un-rotated data because the orientation of the sensors is random and will lead to incorrect results after FK filtering.

Figure 5:
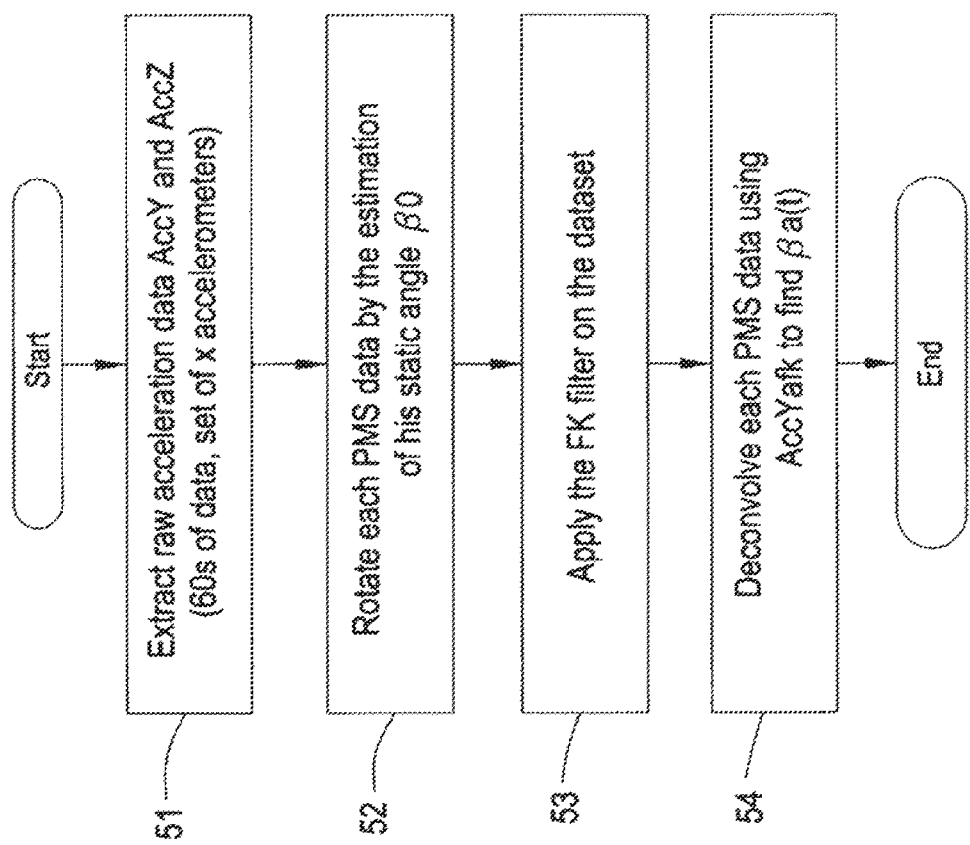
FIG. 5 is a flowchart of a $\beta a(t)$ estimation procedure, which is a second part of a first particular embodiment of the proposed method.

The flowchart of the βa(t) estimation procedure is shown in FIG. 5.

We assume that the $\beta_0$ estimation procedure has been carried out for each of a plurality of particle motion sensors PMS.

In step 51, for each of the particle motion sensors (e.g. accelerometers), the device obtains (extracts) acceleration data AccY(t) and AccZ(t). We consider for example a length of dataset equal to 60 s.

In step 52, for each of the particle motion sensors (e.g. accelerometers), the device 30 rotates the acceleration data AccY(t) and AccZ(t) by the corresponding static position $\beta_0$, to obtain $\beta_0$-rotated data AccYa(t) and AccZa(t).

$$\begin{pmatrix} AccYa(t) \\ AccZa(t) \end{pmatrix} = \begin{pmatrix} \cos\beta_0 & \sin\beta_0 \\ -\sin\beta_0 & \cos\beta_0 \end{pmatrix} \times \begin{pmatrix} AccY(t) \\ AccZ(t) \end{pmatrix}$$

The acceleration data resulting from this operation corresponds to a sensor that oscillates around the vertical position.

In step 53, the device applies a filter (in a particular embodiment, a FK filter applied in the frequency-wavenumber domain) on the $\beta_0$-rotated data AccYa(t) and AccZa(t) previously obtained for the plurality of particle motion sensors, to eliminate transverse acceleration motion (and keep only the gravitational noise) and obtain filtered data AccYafk(t) and AccZafk(t)) for each of the particle motion sensors.

$$\begin{pmatrix} AccYafk(t) \\ AccZafk(t) \end{pmatrix} = \begin{pmatrix} \cos\beta_0 & \sin\beta_0 \\ -\sin\beta_0 & \cos\beta_0 \end{pmatrix} \times g \cdot \begin{pmatrix} -h(t) * \sin\beta(t) \\ h(t) * \cos\beta(t) \end{pmatrix} = g \cdot \begin{pmatrix} -h(t) * \sin\beta a(t) \\ h(t) * \cos\beta a(t) \end{pmatrix}$$

In step 54, for each of the particle motion sensors, computing the angle βa(t), knowing impulse response characteristics of the particle motion sensor and using a deconvolution method. Knowing that βa(t) is very small, we can use the signal AccYafk(t) for this, because sin βa≈βa for small angles.

6.1.5 $\beta_{est}(t)$ Estimation Procedure

For each of the particle motion sensors PMS, $\beta_{est}(t)$ is simply obtained by the sum of $\beta_0$ and βa(t).

Figure 10:
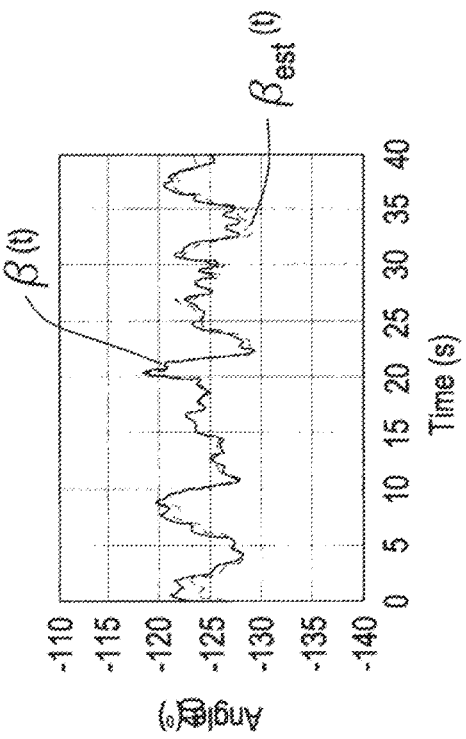
FIG. 10 shows the example of tilt signal of FIG. 7 and an estimate of $\beta_{est}(t)=\beta_0+\beta a(t)$.
Figure 9:
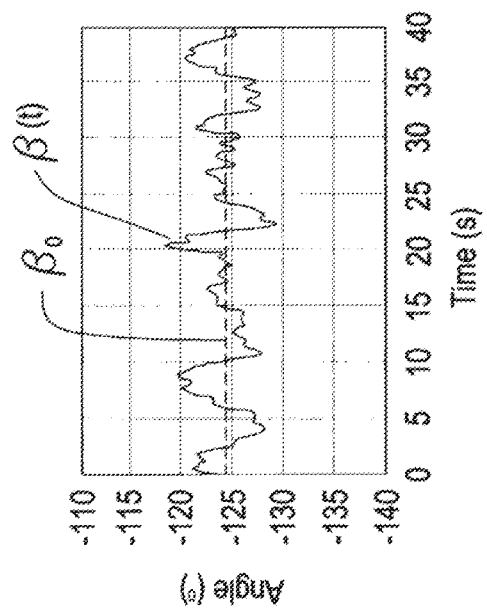
FIG. 9 shows the example of tilt signal of FIG. 7 and an estimate of static angle $\beta_0$.
Figure 8:
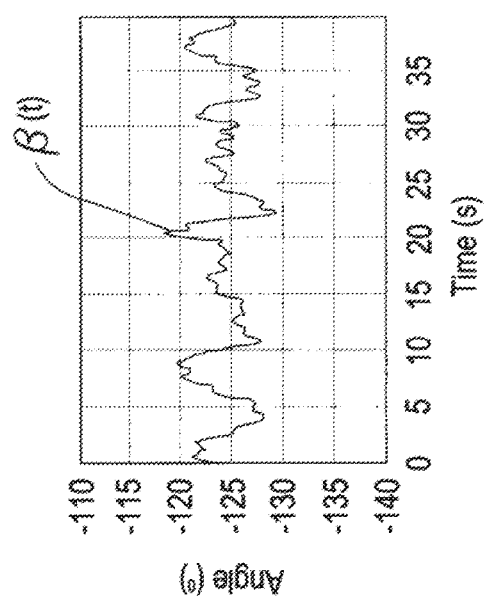
FIG. 8 shows an example of tilt signal.

FIG. 8 shows an example of tilt signal β(t). FIG. 9 shows, for this example of tilt signal β(t), the static angle 130 obtained with the $\beta_0$ estimation procedure discussed above and shown in FIG. 4. FIG. 10 shows, for this example of tilt signal β(t), the estimated tilt signal $\beta_{est}(t)=\beta_0\alpha\beta a(t)$ obtained with the $\beta_0$ estimation procedure and βa(t) estimation procedure discussed above and shown in FIGS. 4 and 5 respectively.

6.1.6 Implementations and Uses

In a first implementation, $\beta_0$ (or $\beta_{est}(t)$) can be used to check the accuracy of a known angular offset β', between the tilt angle β(t) of a given particle motion sensor PMS and the tilt angle α(t) of a tilt sensor nearly collocated, in the multi-sensor streamer, with the given particle motion sensor. In this first implementation, the following steps are carried out (e.g. by the device 30): obtaining tilt data $\alpha_m(t)$ outputted (measured) by the tilt sensor; and checking an accuracy of the known angular offset β', by comparing the angular offset β' with a difference between $\beta_0$ (or $\beta_{est}(t)$ and the tilt data $\alpha_m(t)$.

In a second implementation, $\beta_0$ (or $\beta_{est}(t)$) can be used to compute an estimate $\beta'_{est}$ of an unknown angular offset β', between the tilt angle β(t) of a given particle motion sensor PMS and the tilt angle α(t) of a tilt sensor nearly collocated, in the multi-sensor streamer, with the given particle motion sensor. In this second implementation, the following steps are carried out (e.g. by the device 30): obtaining tilt data $\alpha_m(t)$ outputted (measured) by the tilt sensor; and computing the estimate $\beta'_{est}$ by computing a difference between $\beta_0$ (or $\beta_{est}(t)$) and the tilt data $\alpha_m(t)$.

In a third implementation, $\beta_0$ (or $\beta_{est}(t)$ can be used as a good estimate of the angle β(t) to be used for the rotation of the particle motion sensor data. In this third implementation, the following step is carried out (e.g. by the device 30): rotating the acceleration data AccY(t) and AccZ(t) by $\beta_0$ (or $\beta_{est}(t)$), to obtain final data $AccY_0(t)$ and $AccZ_0(t)$ expressed in the coordinate system (X0,Y0,Z0).

In a fourth implementation, $\beta_0$ (or $\beta_{est}(t)$) can be used as a mean to check the quality of c measured by a tilt sensor nearly collocated, in the multi-sensor streamer, with the given particle motion sensor. In this fourth implementation, the following steps are carried out (e.g. by the device 30): obtaining tilt data $\alpha_m(t)$ outputted by the tilt sensor; obtaining a known angular offset β' between the tilt angles β(t) and α(t); and checking an accuracy of the tilt data $\alpha_m(t)$ by comparing them with a difference between $\beta_0$ (or $\beta_{est}(t)$) and β'.

6.1.7 Combination "Compass"

In another implementation, a magnetometer M (see FIG. 1) is nearly collocated, in the multi-sensor streamer 2, with the particle motion sensor PMS. We assume the orientation of the magnetometer M is known with respect to the particle motion sensor PMS. The following steps are carried out (e.g. by the device 30): obtaining magnetic component data outputted by the magnetometer M; and combining these magnetic component data and $\beta_0$ (or $\beta_{est}(t)$), to obtain compass heading data (i.e. azimuth data).

Although the present disclosure has been described with reference to one or more examples, workers skilled in the art will recognize that changes may be made in form and detail without departing from the scope of the disclosure and/or the appended claims.

6.2 Second Particular Embodiment (Estimation of the Tilt (Roll) Angle and the Pitch Angle)

6.2.1 General Principle

Figure 11:
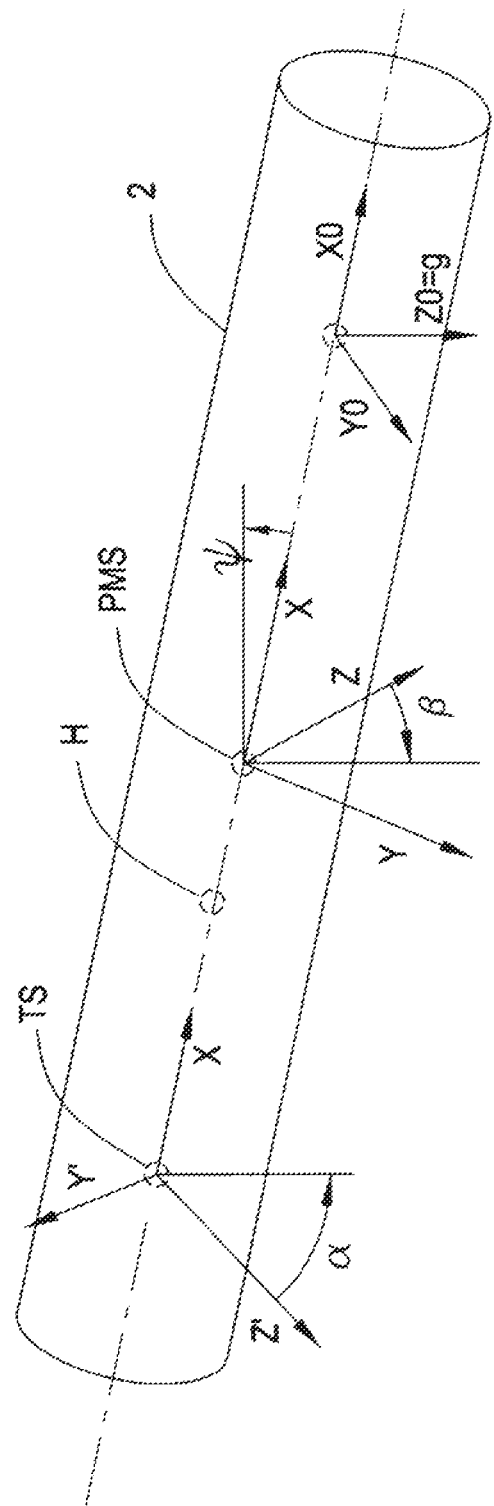
FIG. 11 illustrates both tilt (roll) and pitch angles.

FIG. 11 illustrates both roll (tilt) and pitch angles. As in FIG. 1, we consider an example of a portion of a multi-sensor streamer 2 comprising a group of several sensors which are nearly collocated (i.e. in close proximity): a pressure sensor (e.g. hydrophone) H, a particle motion sensor (e.g. geophone or accelerometer) PMS and a tilt sensor (e.g. a MEMS device) TS.

(X0,Y0,Z0) is the reference right-handed coordinate system. X0 (reference horizontal axis or "true horizontal position") is not collinear with the longitudinal axis 1 of the streamer 2. Z0 (reference vertical axis) is collinear with the gravity vector g (reference vertical axis or "true vertical position") and points towards the earth (Z0=g).

The particle motion sensor PMS is for example a 3-axis accelerometer that measures seismic signal. As this sensor is a piezo-capacitive sensor, it cannot measure the static acceleration (gravity) and therefore cannot measure directly the angular position. The particle motion sensor of FIG. 11 has three orthogonal sensing axes: Y and Z, in a plane orthogonal to the longitudinal axis 1 of the streamer 2, and X collinear with the longitudinal axis 1 of the streamer 2.

The angular position of the PMS in the coordinate system (X0,Y0,Z0) is defined by the roll (tilt) angle $\beta$ and the pitch angle $\Psi$.

As already defined above, the roll (tilt) angle $\beta$ of the PMS is formed by the Z sensing axis and the gravity vector (Z0=g). In other words, the roll (tilt) angle $\beta$ is defined by the rotation around X from Z to Z0.

The pitch angle $\Psi$ is defined by the rotation around Y0 from X to X0. The pitch angle is thus the angle formed by the streamer and the horizontal axis, if we consider that X is collinear with the direction of the streamer by construction.

As seen before, $\beta(t)$ can be written as the sum of $\beta_0$ (the static position) and $\beta a(t)$ (the small angle variation). $\Psi$ can be considered as constant, therefore $\Psi(t)=\Psi_0$.

With two angles (roll and pitch), the system performs a rotation of $\beta$ and then $\Psi$ to rotate the data to express them in the coordinate system (X0,Y0,Z0). In other words, to express the final acceleration data (noted $AccX_0(t)$, $AccY_0(t)$ and $AccZ_0(t)$) in the coordinate system (X0,Y0,Z0), the system performs a double rotation of $\beta(t)$ and $\Psi_0$, according to the following formula:

$$\begin{pmatrix} AccX_0(t) \\ AccY_0(t) \\ AccZ_0(t) \end{pmatrix} = R(\Psi 0) \cdot R(\beta(t)) \cdot \begin{pmatrix} AccX(t) \\ AccY(t) \\ AccZ(t) \end{pmatrix}$$

$$\begin{pmatrix} AccX_0(t) \\ AccY_0(t) \\ AccZ_0(t) \end{pmatrix} = \begin{pmatrix} \cos\Psi 0 & 0 & -\sin\Psi 0 \\ 0 & 1 & 0 \\ \sin\Psi 0 & 0 & \cos\Psi 0 \end{pmatrix} \begin{pmatrix} 1 & 0 & 0 \\ 0 & \cos\beta(t) & \sin\beta(t) \\ 0 & -\sin\beta(t) & \cos\beta(t) \end{pmatrix} \begin{pmatrix} AccX(t) \\ AccY(t) \\ AccZ(t) \end{pmatrix}$$

6.2.2 $\beta_0$ and $\Psi_0$ Estimation Procedure

Figure 12:
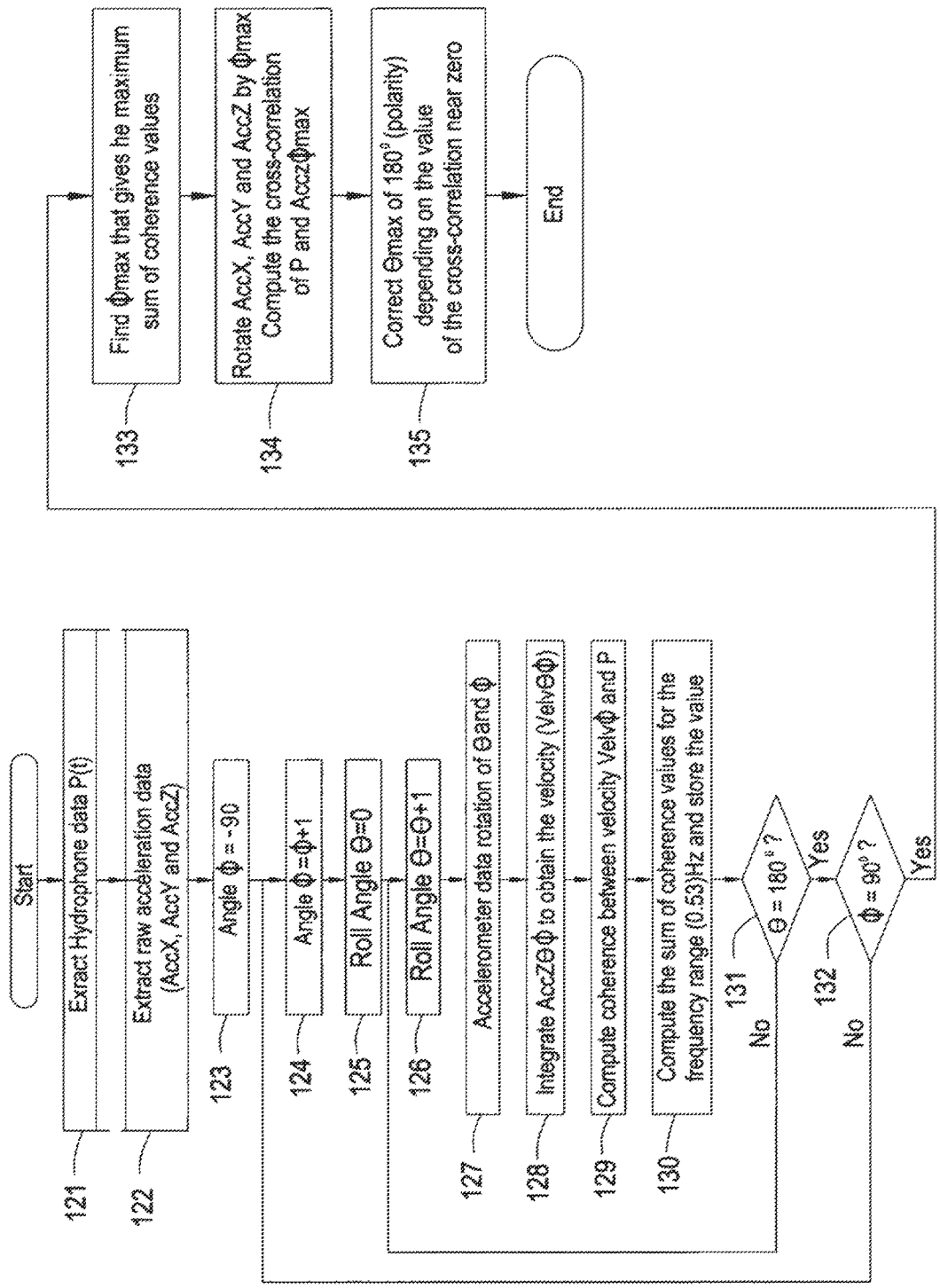
FIG. 12 is a flowchart of a $\beta_0$ and $\Psi_0$ estimation procedure, which is a first part of a second particular embodiment of the proposed method.

The flowchart of this procedure is shown in FIG. 12, for the particle motion sensor (accelerometer in the below example) PMS of a given group of nearly collocated sensors (as defined above).

In step 121, the device 30 obtains (extracts) hydrophone data P(t) measured by the hydrophone H.

In step 122, the device obtains (extracts) acceleration data, AccX(t), AccY(t) and AccZ(t), measured by the accelerometer PMS along the sensing axes X, Y and Z respectively.

In step 123, an angle $\varphi$ (which is a variable used to estimate the pitch angle) is initialized to $-90°$.

In step 125, an angle $\theta$ (which is a variable used to estimate the roll angle) is initialized to zero.

For different pairs of values of $\theta$ and $\varphi$, the device carries out steps 127 to 130. Each pair of values comprises a value of $\theta$ between 0 and $\pi$ radians (in this example, 180 values, one per degree from 1° to 180°; see steps 126 and 131) and a value of $\varphi$ between $-\pi/2$ and $\pi/2$ radians (in this example, 180 values, one per degree from $-90°$ to $90°$; see steps 124 and 132).

In step 127, the device rotates the acceleration data AccX(t), AccY(t) and AccZ(t), by the current value of the angles $\theta$ and $\varphi$, to obtain rotated acceleration data $AccX_{\theta\varphi}(t)$, $AccY_{\theta\varphi}(t)$ and $AccZ_{\theta\varphi}(t)$:

$$\begin{pmatrix} AccX_{\theta\phi}(t) \\ AccY_{\theta\phi}(t) \\ AccZ_{\theta\phi}(t) \end{pmatrix} = \begin{pmatrix} \cos\phi & 0 & -\sin\phi \\ 0 & 1 & 0 \\ \sin\phi & 0 & \cos\phi \end{pmatrix} \begin{pmatrix} 1 & 0 & 0 \\ 0 & \cos\theta & \sin\theta \\ 0 & -\sin\theta & \cos\theta \end{pmatrix} \begin{pmatrix} AccX(t) \\ AccY(t) \\ AccZ(t) \end{pmatrix}$$

In step 128, the devices integrates the rotated acceleration data $AccZ_{\theta\varphi}(t)$ to obtain velocity data $Velv\theta\varphi$.

In step 129, the device computes a coherence value between the hydrophone data P(t) and the velocity data $Velv\theta\varphi$ (see step 47 of FIG. 4).

In step 130, the device computes the sum of coherence values for a determined number of frequencies comprised in a determined frequency range, and stores the sum value. In a particular embodiment, the frequency range is [0.5 Hz 3 Hz] and a step of 0.1 Hz between 0.5 and 3 Hz can be used (i.e. the following frequencies are used: 0.1 Hz, 0.2 Hz, 0.3 Hz . . . till 3 Hz).

In step 133, the device finds $\theta_{max}$ and $\varphi_{max}$, the value of $\theta$ and $\varphi$ associated with the maximum sum value. In other words, $\theta_{max}$ and $\varphi_{max}$ maximize the coherence between the hydrophone data P(t) and the velocity data $Velv\theta\varphi$.

In an alternative embodiment, step 128 is omitted and in step 129 the device computes a coherence value between the hydrophone data P(t) and the rotated acceleration data $AccZ_{\theta\varphi}(t)$. In this case, $\theta_{max}$ and $\varphi_{max}$ found in step 133 maximize the coherence between the hydrophone data P(t) and the rotated acceleration data $AccZ_{\theta\varphi}(t)$.

Steps 134 and 135 are carried out to remove an ambiguity concerning the coherence results, which give a maximum for both $AccZ_{\theta max,\varphi max}$ pointing downward (like Z0) and $AccZ_{\theta max,\varphi max}$ pointing upward.

In step 134, the device rotates the acceleration data AccX(t), AccY(t) and AccZ(t), by $\theta_{max}$ and $\varphi_{max}$, to obtain $\theta_{max}$ and $\varphi_{max}$-rotated acceleration data $AccY_{\theta max,\varphi max}(t)$, $AccY_{\theta max,\varphi max}(t)$ and $AccZ_{\theta max,\varphi max}(t)$. Then the device computes a cross-correlation between the $AccZ_{\theta max,\varphi max}(t)$ and the hydrophone data P(t).

In step 135, depending on the value of the cross-correlation function around 0, the value of $\theta_{max}$ obtained in the previous step 133 is corrected or not by $\pi$ radians (180°). The value of $\theta_{max}$ needs (respectively doesn't need) to be corrected if the cross-correlation function gives a negative (respectively positive) value around the zero region of the time axis.

Steps 134 and 135 is not needed for $\varphi$, as the value of the pitch angle is supposed be very low and in any case in the range $[-\pi/2 \ \pi/2]$.

The values resulting from step 133 are used as follows: the value of $\theta_{max}$ (corrected if necessary in step 135) is equal to $\beta_0$, and the value of $\varphi_{max}$ is equal to $\Psi_0$.

6.2.3 $\beta a(t)$ Estimation Procedure

The estimation of the angle $\beta a(t)$ is based on the following principle. Let's say that the streamer is rotating and that the gravity g is the only acceleration seen by the streamer (radial, centripetal and transverse accelerations are ignored).

The real accelerations (we put aside the effects of the high-pass filter for the time being) are:

$$\begin{pmatrix} Acc_{real}X_\theta(t) \\ Acc_{real}Y_\theta(t) \\ Acc_{real}Z_\theta(t) \end{pmatrix} = R(\Psi_\theta) \cdot R(\beta(t)) \cdot \begin{pmatrix} Acc_{real}X(t) \\ Acc_{real}Y(t) \\ Acc_{real}Z(t) \end{pmatrix} = \begin{pmatrix} 0 \\ 0 \\ g \end{pmatrix}$$

Thus we can write:

$$\begin{pmatrix} Acc_{real}X(t) \\ Acc_{real}Y(t) \\ Acc_{real}Z(t) \end{pmatrix} = R(-\beta(t)) \cdot R(-\Psi_0) \cdot \begin{pmatrix} 0 \\ 0 \\ g \end{pmatrix} = g \cdot \begin{pmatrix} \sin\Psi 0 \\ -\cos\Psi_0 \cdot \sin\beta(t) \\ \cos\Psi_0 \cdot \cos\beta(t) \end{pmatrix}$$

Taking into account that the analog sensors (particle motion sensor PMS) used in seismic streamer behave as high-pass filters and cannot record constant signal, the accelerations recorded by the sensor will be:

$$\begin{pmatrix} AccX(t) \\ AccY(t) \\ AccZ(t) \end{pmatrix} = \begin{pmatrix} h(t) * Acc_{real}X(t) \\ h(t) * Acc_{real}Y(t) \\ h(t) * Acc_{real}Z(t) \end{pmatrix} = g \cdot \begin{pmatrix} 0 \\ -\cos\Psi_0 h(t) * \sin\beta(t) \\ \cos\Psi_0 \cdot h(t) * \cos\beta(t) \end{pmatrix}$$

where h is the impulse response of the input filter (usually 1st or 2nd order high pass filter) of the analog sensor and * is the convolution product operator.

The statement above is true for an ideal streamer but not for a real streamer that sees not only the gravity but also strong transverse accelerations. The goal is then to keep only the part of the signal that is related to the rotational motion. Therefore an adequate filter in the FK (frequency-wavenumber) domain can be used to eliminate the transverse acceleration motion from the acceleration data and obtain a signal nearby the ideal case described above where only the gravitational noise remains.

However, it is not possible to apply the filter on un-rotated data because the orientation of the sensors is random and will lead to incorrect results after FK filtering.

As for the first embodiment described above for the 2D-case, we must first rotate the data by the static angle position $\beta_0$ before being able to apply a FK filter on a plurality of sensors.

We describe now the steps of the $\beta a(t)$ estimation procedure (which is close to the one shown in FIG. 5 for the 2D-case).

We assume that the $\beta_0$ and $\Psi_0$ estimation procedure has been carried out for each of a plurality of particle motion sensors PMS.

For each of the particle motion sensors (e.g. accelerometers), the device obtains (extracts) acceleration data AccX(t), AccY(t) and AccZ(t). We consider for example a length of dataset equal to 60 s.

For each of the particle motion sensors (e.g. accelerometers), the device rotates the acceleration data AccX(t), AccY(t) and AccZ(t) by the corresponding static positions $\beta_0$, to obtain $\beta_0$-rotated data AccXa(t), AccYa(t) and AccZa(t).

$$\begin{pmatrix} AccXa(t) \\ AccYa(t) \\ AccZa(t) \end{pmatrix} = R(\beta 0) \begin{pmatrix} AccX(t) \\ AccY(t) \\ AccZ(t) \end{pmatrix}$$

The acceleration data resulting from this operation corresponds to a sensor that oscillates around the vertical position.

Then the device applies a filter (in a particular embodiment, a FK filter applied in the frequency-wavenumber domain) on the $\beta_0$-rotated data AccXa(t), AccYa(t) and AccZa(t) previously obtained for the plurality of particle motion sensors, to eliminate transverse acceleration motion (and keep only the gravitational noise) and obtain filtered data AccXafk(t), AccYafk(t) and AccZafk(t)) for each of the particle motion sensors.

$$\begin{pmatrix} AccXafk(t) \\ AccYafk(t) \\ AccZafk(t) \end{pmatrix} = g \begin{pmatrix} 1 & 0 & 0 \\ 0 & \cos\beta_0 & \sin\beta_0 \\ 0 & -\sin\beta_0 & \cos\beta_0 \end{pmatrix} \begin{pmatrix} 0 \\ -\cos\Psi_0 h(t) * \sin\beta(t) \\ \cos\Psi_0 \cdot h(t) * \cos\beta(t) \end{pmatrix}$$

$$\begin{pmatrix} AccXafk(t) \\ AccYafk(t) \\ AccZafk(t) \end{pmatrix} =$$

$$g \begin{pmatrix} 0 \\ -\cos\Psi_0 \cdot \cos\beta_0 \cdot h(t) * \sin\beta(t) + \cos\Psi_0 \cdot \sin\beta_0 \cdot h(t) * \cos\beta(t) \\ \cos\Psi_0 \cdot \sin\beta_0 \cdot h(t) * \sin\beta(t) + \cos\Psi_0 \cdot \cos\beta_0 \cdot h(t) * \cos\beta(t) \end{pmatrix}$$

$$\begin{pmatrix} AccXafk(t) \\ AccYafk(t) \\ AccZafk(t) \end{pmatrix} = g \begin{pmatrix} 0 \\ -\cos[\Psi_0 \cdot h(t) * [\cos]\beta_0 \cdot \sin\beta(t) - \sin\beta_0 \cdot \cos\beta(t)] \\ \cos\Psi_0 h(t) * [\sin]\beta_0 \cdot \sin\beta(t) + [\cos\beta_0 \cdot \cos\beta(t)] \end{pmatrix}$$

$$\begin{pmatrix} AccXafk(t) \\ AccYafk(t) \\ AccZafk(t) \end{pmatrix} = g \begin{pmatrix} 0 \\ -\cos\Psi 0 \cdot h(t) * \sin(\beta(t) - \beta_0) \\ \cos\Psi 0 \cdot h(t) * \cos(\beta(t) - \beta_0) \end{pmatrix}$$

Also $$\begin{pmatrix} AccXafk(t) \\ AccYafk(t) \\ AccZafk(t) \end{pmatrix} = g \begin{pmatrix} 0 \\ -\cos\Psi 0 \cdot h(t) * \sin\beta a(t) \\ \cos\Psi 0 \cdot h(t) * \cos\beta a(t) \end{pmatrix}$$

For each of the particle motion sensors, the device computes the angle $\beta a(t)$, knowing impulse response characteristics of the particle motion sensor and using a deconvolution method (provided that $\Psi 0$ is in an acceptable range (as it should be the case for a streamer) and not too close to $\pi/2$). Knowing that $\beta a(t)$ is very small, we can use the signal AccYafk(t) for this, because sin $\beta a \approx \beta a$ for small angles.

6.2.4 $\beta_{est}(t)$ Estimation Procedure

For each of the particle motion sensors PMS, $\rho_{est}(t)$ is simply obtained by the sum of $\beta_0$ and $\beta a(t)$.

The invention claimed is:

1. Method for estimating a tilt angle $\beta(t)$ of at least one given particle motion sensor nearly collocated, in a multi-sensor streamer for seismic prospection, with a pressure sensor, having two orthogonal sensing axes Y and Z in a plane orthogonal to a longitudinal axis of the streamer, the tilt angle being formed by said Z sensing axis and a reference vertical axis Z0, said method comprising:
   for said given particle motion sensor, a step of computing a first estimate $\beta_0$ of said tilt angle, comprising, while the streamer is being towed:
       obtaining first data (P(t)) measured by the pressure sensor nearly collocated with said given particle motion sensor;
       obtaining second and third data (AccY(t), AccZ(t)) measured by said given particle motion sensor along the sensing axes Y and Z respectively;
       for at least two values of a rotation angle $\theta$, rotating the second and third data by the rotation angle $\theta$, said rotation angle $\theta$ corresponding to a rotation angle around an axis X orthogonal to sensing axes Y and Z, to obtain rotated second and third data (AccY$_\theta$(t), AccZ$_\theta$(t)); and
       computing a particular value $\theta_{max}$ among said at least two values of the rotation angle, which maximizes, over at least one frequency, a coherence function between the first data and the rotated third data, or between the first data and velocity data resulting from an integration of the rotated third data, said particular value $\theta_{max}$ being equal to said first estimate $\beta_0$,
   wherein said step of computing a first estimate $\beta_0$ of said tilt angle is processed independently of any seismic signal.

2. Method according to claim 1, wherein the coherence function is maximized over a predetermined range of frequencies, said frequencies corresponding to frequencies related to the changes in the height of the water column above the pressure sensor and said given particle motion sensor.

3. Method according to claim 1, wherein the coherence function is maximized over a predetermined range of frequencies that is 0.5 Hz to 3 Hz.

4. Method according to claim 1, wherein said given particle motion sensor is a piezoelectric sensor.

5. Method according to claim 1, wherein said step of computing the first estimate $\beta_0$ of said tilt angle further comprises:
   rotating the third data by the particular value $\theta_{max}$ of the rotation angle $\theta$, to obtain $\theta_{max}$-rotated third data (AccZ$_{\theta max}$(t));
   computing a cross-correlation between the $\theta_{max}$-rotated third data (AccZ$_{\theta max}$(t)) and the first data (P(t)); and
   depending on the computed cross-correlation, correcting or not by $\pi$ radians the particular value $\theta_{max}$.

6. Method according to claim 1, wherein said step of computing the first estimate $\beta_0$ of the tilt angle is carried out for each of a plurality of particle motion sensors, and in that it comprises a step of computing a second estimate $\beta_{est}(t) = \beta_0 + \beta a(t)$, of the tilt angle for each of the plurality of particle motion sensors, comprising:
   for each of the particle motion sensors, rotating the second and third data by a rotation angle equal to the first estimate $\beta_0$, to obtain $\beta_0$-rotated second and third data (AccYa(t), AccZa(t));
   applying a filter on the $\beta_0$-rotated second and third data previously obtained for the plurality of particle motion sensors, to eliminate transverse acceleration motion and obtain filtered second and third data (AccYafk(t), AccZafk(t)) for each of the particle motion sensors;
   for each of the particle motion sensors, computing the angle $\beta a(t)$, knowing impulse response characteristics of said particle motion sensor and using a deconvolution method;
   for each of the particle motion sensors, obtaining the second estimate $\beta_{est}(t)$ of the tilt angle, by summing the first estimate $\beta_0$ and the angle $\beta a(t)$.

7. Method according to any one of the claim 1, wherein it comprises, for said at least one given particle motion sensor, the following step:
   rotating the second and third data (AccY(t), AccZ(t)) by a rotation angle equal to the first estimate $\beta_0$ or the second estimate $\beta_{est}(t)$, to obtain final data (AccY$_0$(t), AccZ$_0$(t)) expressed in a coordinate system (X0,Y0, Z0), with Z0 said reference vertical axis and X0 a reference horizontal axis considered as collinear with the longitudinal axis of the streamer.

8. Method according to claim 6, wherein said filter is a FK filter applied in the frequency-wavenumber domain.

9. Method according to claim 1, wherein it comprises, for said at least one given particle motion sensor, the following steps:
   obtaining tilt data outputted by a tilt sensor nearly collocated, in the multi-sensor streamer, with said given particle motion sensor and relating to a tilt angle $\alpha(t)$ of said tilt sensor;
   checking an accuracy of a known angular offset $\beta'$, between the tilt angle $\beta(t)$ of said given particle motion sensor and the tilt angle $\alpha(t)$ of said tilt sensor, by comparing said angular offset $\beta'$ with a difference between the first estimate $\beta_0$ or the second estimate $\beta_{est}(t)$ and the tilt data outputted by the tilt sensor.

10. Method according to any one of claim 1, wherein it comprises, for said at least one given particle motion sensor, the following steps:
    obtaining tilt data outputted by a tilt sensor nearly collocated, in the multi-sensor streamer, with said given particle motion sensor and relating to a tilt angle $\alpha(t)$ of said tilt sensor;
    computing an estimate $\beta'_{est}$ of an unknown angular offset $\beta'$, between the tilt angle $\beta(t)$ of said given particle motion sensor and the tilt angle $\alpha(t)$ of said tilt sensor, by computing a difference between the first estimate $\beta_0$ or the second estimate $\beta_{est}(t)$ and the tilt data outputted by the tilt sensor.

11. Method according to claim 1, wherein it comprises, for said at least one given particle motion sensor, the following steps:
    obtaining tilt data outputted by a tilt sensor nearly collocated, in the multi-sensor streamer, with said given particle motion sensor and relating to a tilt angle $\alpha(t)$ of said tilt sensor;
    obtaining a known angular offset $\beta'$, between the tilt angle $\beta(t)$ of said given particle motion sensor and the tilt angle $\alpha(t)$ of said tilt sensor;
    checking an accuracy of said tilt data, by comparing said tilt data with a difference between the first estimate $\beta_0$ or the second estimate $\beta_{est}(t)$ and the known angular offset $\beta'$.

12. Method according to claim 1, wherein it comprises, for said at least one given particle motion sensor, the following steps:

obtaining magnetic component data outputted by a magnetometer nearly collocated, in the multi-sensor streamer, with said given particle motion sensor;

combining said magnetic component data and the first estimate $\beta_0$ or the second estimate $\beta_{est}(t)$ of the tilt angle $\beta(t)$ of said given particle motion sensor, to obtain compass heading data.

\* \* \* \* \*